United States Patent
Allen et al.

(10) Patent No.: US 7,970,852 B2
(45) Date of Patent: Jun. 28, 2011

(54) METHOD FOR MOVING OPERATING SYSTEMS BETWEEN COMPUTER ELECTRONIC COMPLEXES WITHOUT LOSS OF SERVICE

(75) Inventors: James P. Allen, Austin, TX (US); Michael Paul Cyr, Georgetown, TX (US); James A. Pafumi, Leander, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 12/136,036

(22) Filed: Jun. 9, 2008

(65) Prior Publication Data

US 2009/0307330 A1   Dec. 10, 2009

(51) Int. Cl.
  *G06F 15/167* (2006.01)
  *G06F 3/00* (2006.01)
  *G06F 9/00* (2006.01)
(52) U.S. Cl. .................... 709/216; 719/324; 726/15
(58) Field of Classification Search ............ 709/216; 719/324; 726/15
  See application file for complete search history.

(56) References Cited

U.S. PATENT DOCUMENTS

| | | | |
|---|---|---|---|
| 6,968,463 B2 | 11/2005 | Pherson et al. | |
| 2004/0205582 A1* | 10/2004 | Schiller et al. | 715/513 |
| 2006/0130052 A1 | 6/2006 | Allen et al. | |
| 2007/0174851 A1* | 7/2007 | Smart | 719/324 |
| 2007/0239989 A1 | 10/2007 | Barnett et al. | |
| 2008/0127326 A1* | 5/2008 | Dugan et al. | 726/15 |

OTHER PUBLICATIONS

Jones, "Deploying Virtual Servers in a SAN Environment", Jun. 5, 2008 Virtual Strategy Magazine, pp. 1-3 http://www.virtual-strategy.com/Features/Deploying-Virtual-Servers-in-a-SAN-Environment.html.

* cited by examiner

*Primary Examiner* — Phouc Nguyen
*Assistant Examiner* — Mark D Fearer
(74) *Attorney, Agent, or Firm* — Yee & Associates, P.C.; Libby Z. Toub

(57) ABSTRACT

A system and method for migrating a client partition between computer electronic complexes (CECs) while maintaining access to a Storage Area Network. An active and inactive world wide port name are generated for a client virtual channel adapter. A query is sent to a name server from the VIOS on the source CEC. The name server creates a list of small computer system interface (SCSI) targets that are available. The list is used by the VIOS on the destination CEC to verify whether any physical ports in the destination CEC have access to the same SCSI target. The client partition may be migrated between a source CEC and a destination CEC and the access to the Storage Area Network access may be maintained.

18 Claims, 3 Drawing Sheets

METHOD FOR MOVING OPERATING SYSTEMS BETWEEN COMPUTER ELECTRONIC COMPLEXES WITHOUT LOSS OF SERVICE

BACKGROUND OF THE INVENTION

1. Field of the Invention

The present disclosure relates generally to computer system partition mobility and more specifically to a method and system for migrating a client partition between computer electronic complexes through the use of a pair of world wide port names.

2. Description of the Related Art

NPort identifiers, also known as NPIV, are part of the IEEE Fibre Channel standard. The NPort identifiers allows sharing of physical Fibre Channel (FC) ports by multiple operating systems or initiators by letting each initiator have its own World Wide Port Names (WWPNs). An initiator may receive access to logical units (LUNs) through a SCSI target port in a Storage Area Network (SAN) by using one or more WWPNs owned by the initiator. This capability architecturally allows multiple operating systems to share a physical port on a FC Adapter. Multiple operating systems may share a Computer Electronics Complex (CEC), or server, that has firmware, and software capabilities to provide small computer system interface (SCSI) Input/Output (I/O) services to each operating system by virtualizing physical hardware.

BRIEF SUMMARY OF THE INVENTION

This disclosure describes a method and system of migrating a client partition from one Computer Electronic Complex (CEC) to another CEC. The client partition may be migrated while the client partition is running without I/O failures, loss of service or decreased network security.

According to one disclosed class of innovative embodiments, there is provided a computer implemented method for migrating a client between computer electronic complexes (CECs), the method comprising generating a pair of world wide port names (WWPNs) for a virtual fibre channel adapter, the virtual fibre channel adapter being associated with a client. One of the pair of WWPNs is considered an active world wide port name (WWPN) and a second one of the pair of WWPNs is initially an inactive WWPN.

Input/output (I/O) operations using the active WWPN of the client may be performed while a multi-step migration is in progress so that and the client is migrated from a source computer electronic complex (CEC) to a destination CEC seamlessly. Once migrated, the VIOS logs onto the fibre channel fabric on behalf of the client on the destination CEC using the formerly inactive WWPN.

According to another disclosed class of innovative embodiments, there is disclosed a system for enabling a partition migration. The system comprises at least two computer electronic complexes (CECs), each CEC comprising at least one Virtual Input/Output Server (VIOS) and a hypervisor, an orchestrator, the orchestrator coordinating the partition migration; a storage area network, the storage area network comprising a plurality of SCSI targets; and a fibre channel fabric, the fibre channel fabric comprising a name server, at least one NPIV capable switch, and at least one storage appliance; wherein a client of the CEC is migrated during an I/O operation.

The embodiments of the disclosure provide an advantage of enhanced performance by moving low priority workloads off of systems to create more production resources on a system or moving high priority partitions to systems with more resources.

The embodiments of the disclosure provide an advantage of increased flexibility by moving workloads from one system to another as business requirements may change. Additionally, increased flexibility may enable the planning of an evacuation or transfer of a system during a scheduled maintenance.

The embodiments of the disclosure also provide an increased efficiency advantage. Workloads may be moved or migrated from under-utilized machines so they can be switched off.

The embodiments of the disclosure also provide an increased security advantage by ensuring that the SCSI targets of the storage area network are only available to selected initiators. These and other advantages will be more clearly understood from the following detailed description taken in conjunction with the accompanying drawings and claims.

BRIEF DESCRIPTION OF THE SEVERAL VIEWS OF THE DRAWINGS

For a more complete understanding of the present disclosure and the advantages thereof, reference is now made to the following brief description, taken in connection with the accompanying drawings and detailed description, wherein similar or identical reference numerals represent similar or identical parts.

DETAILED DESCRIPTION OF THE INVENTION

Figure 1:
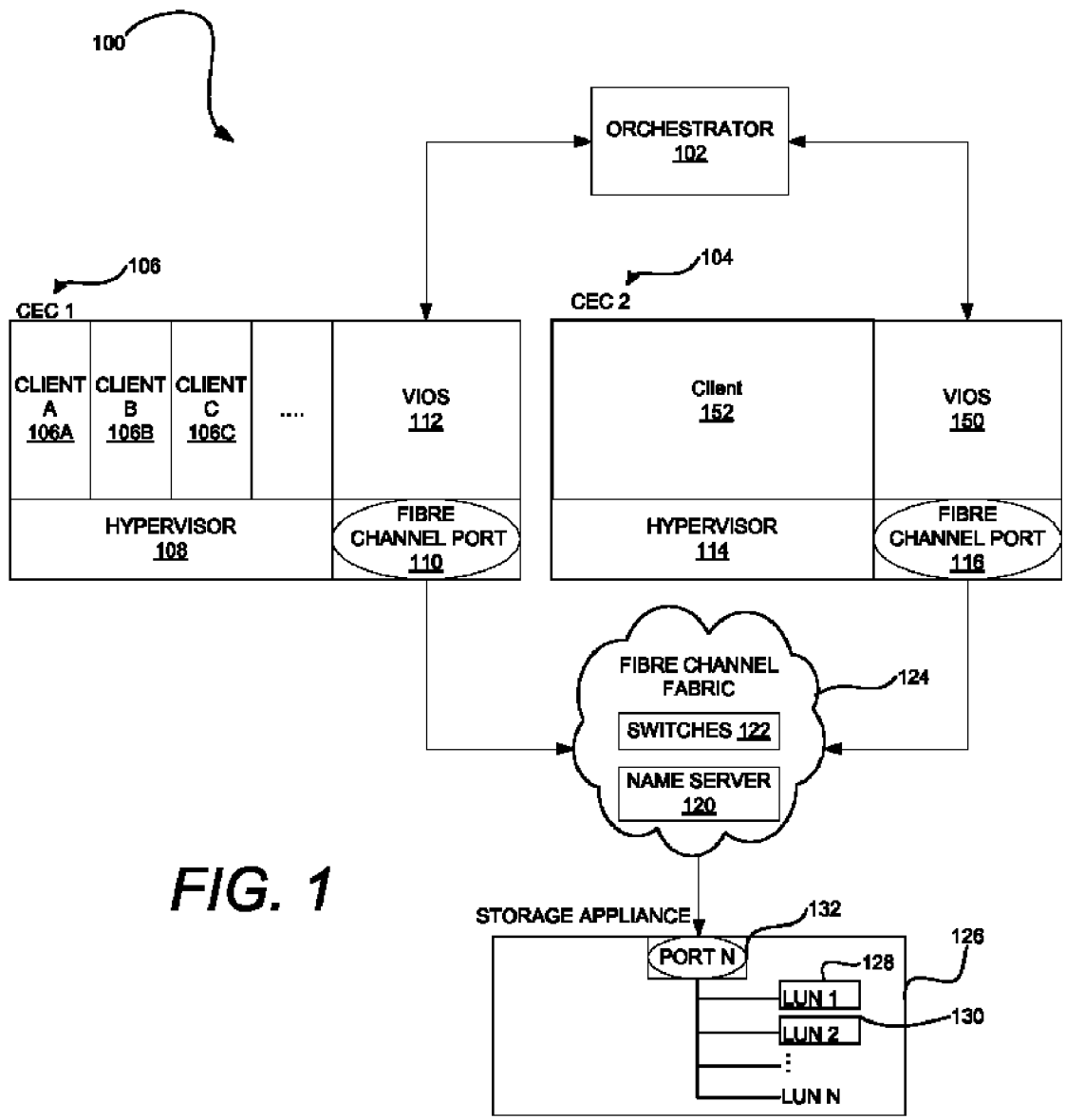
FIG. 1 is a diagram of the system elements involved in a partition migration.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In embodiments of this disclosure, a client operating system may be migrated between a source CEC and a destination CEC without having all SCSI targets for all clients mapped to a single agent. The client may be migrated without loss of service.

In FIG. 1, diagram 100 illustrates a diagram of system elements involved in a partition migration. In one embodiment, client A 106A may be migrated from CEC 1 106 to CEC 2 104. Orchestrator 102 orchestrates the migration of the client by sending commands to the source VIOS 112 in the source CEC 106 and destination VIOS 150 in the destination CEC 104. It must be recognized that the source and destination VIOS notations are not fixed. A CEC may serve as either a source CEC or destination CEC depending on the embodiment. The orchestrator 102 may issue a command to the VIOS 112 of CEC 1 106 to capture Extensible Markup Language (XML) XML that may be generated based on issuing the command.

The command may include a get adapter command or some other command known to one skilled in the art. The command query may be issued from a source Virtual I/O Server (VIOS) 112 on the source CEC 106 to a name server 120 through a virtual fibre channel port 110. The VIOS 112 on the source CEC 106 may determine which client WWPN, or NPort Identifier (NPIV) is active. The active WWPN and the physical adapter port may be used to query the name server 120 in the Fibre Channel (FC) Fabric 118 regarding what SCSI ports may be accessed by the client. It must be noted that the command never reaches the SCSI device and is therefore non-destructive.

The name server 120 may return a list of WWPNs of the SCSI targets to the VIOS 112. The VIOS 112 may then generate an XML data stream including the SCSI target information.

The XML data stream that may be generated based on the get adapter command may be returned to the orchestrator 102 on the destination CEC 104. The VIOS 112 uses the XML data stream to determine which FC ports may be used to grant access to the FC fabric 124. The orchestrator may issue a set adapter command. The set adapter command may map a virtual fibre channel server adapter to an FC port that meets the requirements of the get adapter command.

The orchestrator may send the XML data stream to the destination CEC and issue a find devices command comprised of the XML data stream. The find devices command goes to the VIOS of the destination CEC and verifies whether access is possible to the FC ports of each partition.

Figure 2:
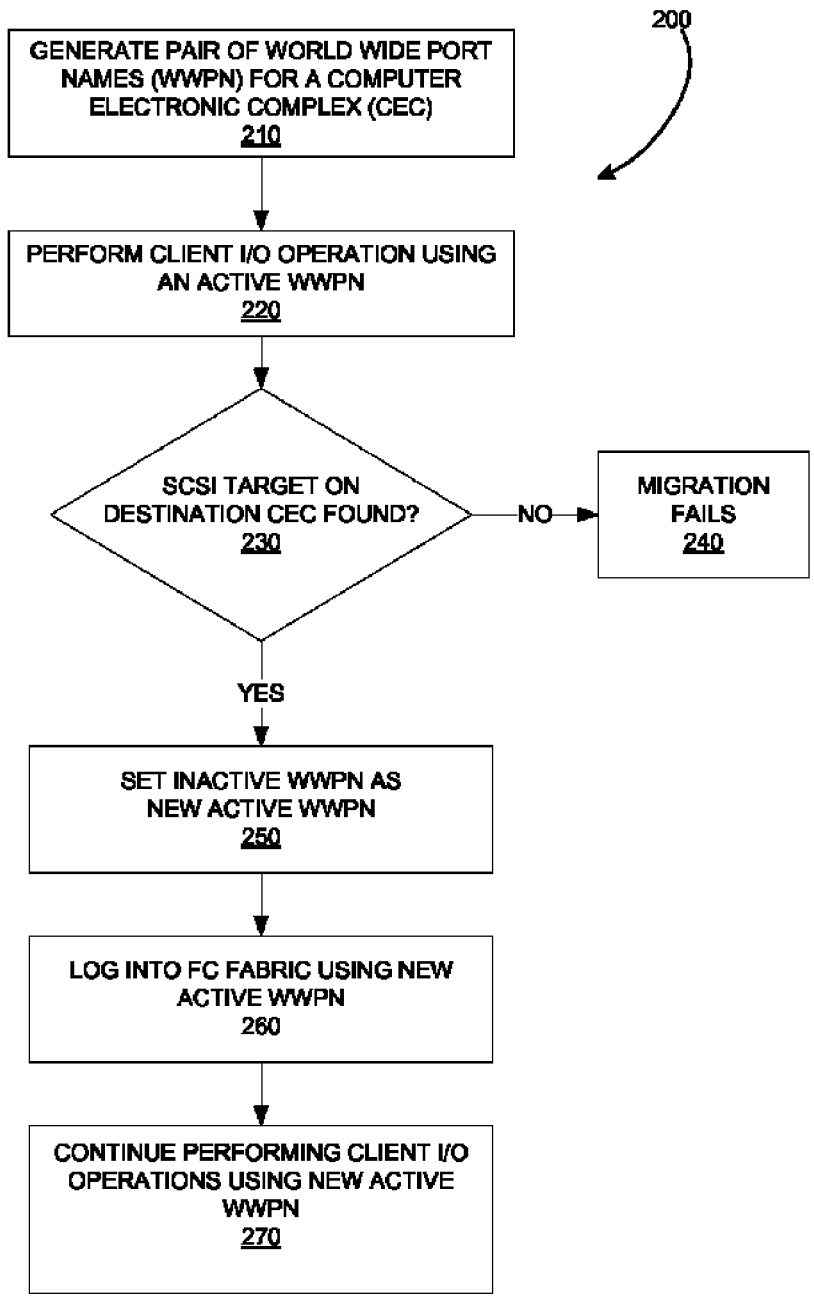
FIG. 2 depicts a high level flowchart of the process of partition migration according to one embodiment of the current disclosure.

FIG. 2 discloses one embodiment of the overall processing of partition migration that comprises migrating a client from a source CEC to a destination CEC. As part of that migration, an inactive WWPN may be used to verify access to one or more SCSI targets on a destination CEC block. Once verified, the inactive port name may be activated to be used by the client to continue a seamless performance of I/O operations.

At a block 210, a pair of WWPNs may be generated for a CEC. One of the WWPNs may be active to perform I/O processing and the other WWPN may be inactive. I/O operations may be performed using the active WWPN at a block 220. At a block 230, the inactive WWPN may be used to verify access to SCSI targets on the destination CEC. If SCSI targets on the destination CEC are not found at a block 230, then the partition migration may be considered as failed at a block 240. If SCSI targets on the source CEC are found, then a block 250, the inactive WWPN may be set as a new active WWPN. At a block 260, the client may be logged into the FC fabric using the new active WWPN. At a block 270, the client continues performing I/O operations using the new active WWPN.

Figure 3:
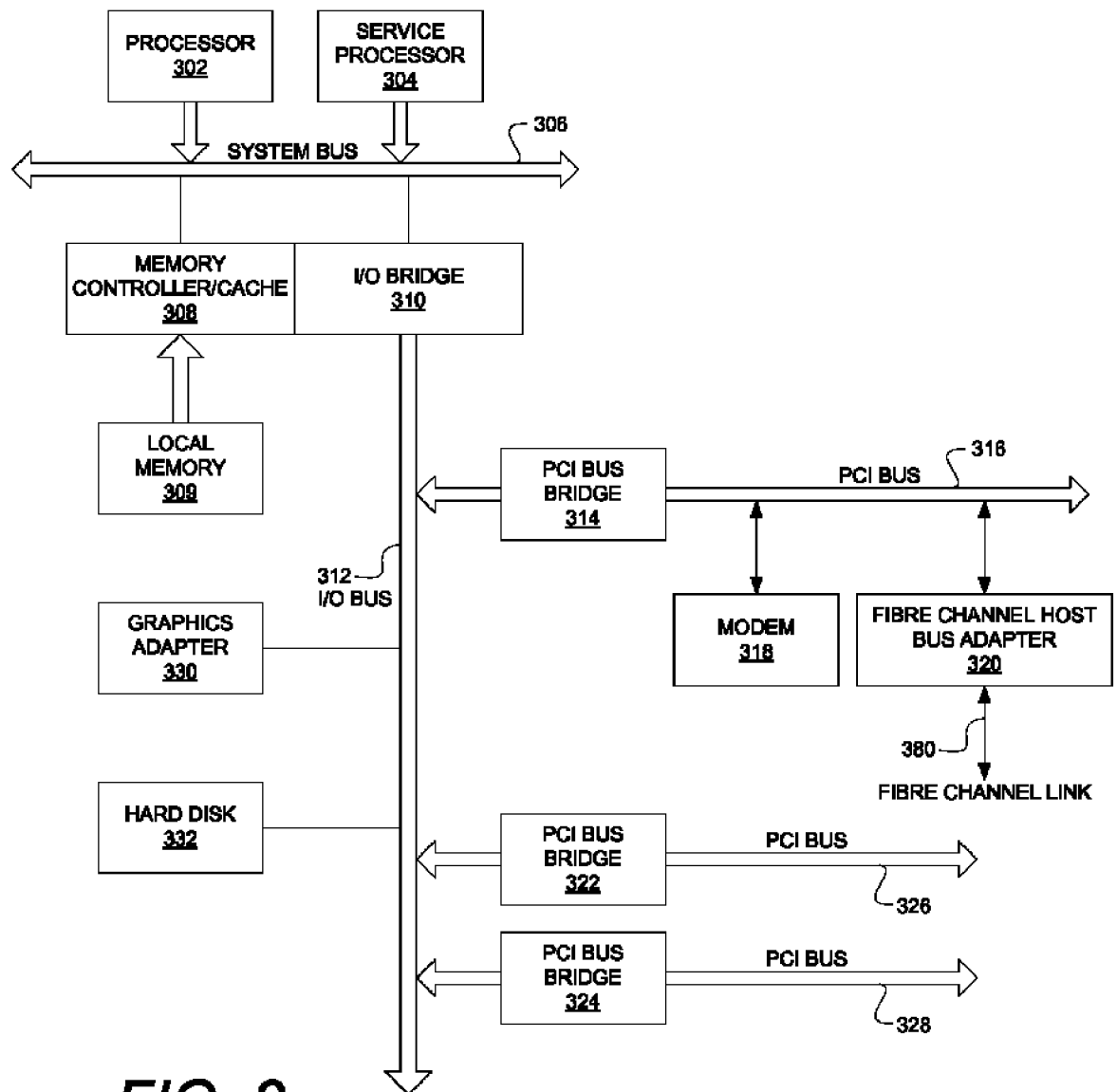
FIG. 3 is a block diagram of a data processing system in which illustrative embodiments may be implemented.

FIG. 3 is a block diagram of a data processing system that is used to implement any of the data processing systems of FIG. 1 in accordance with the present invention. Data processing system 300 may be a symmetric multiprocessor (SMP) system including a plurality of processors 302 and 304 connected to system bus 306. Alternatively, a single processor system may be employed. In the depicted example, processor 304 is a service processor. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of I/O adapters, such as modem 318 may be connected to PCI bus 316. Typical PCI bus implementations will support four PCI expansion slots or add-in connectors. Communications links to other computers may be provided through modem 318 and Fibre channel host bus adapter 320. Host Bus Adapter (HBA) 320 enables data processing system 300 to send and receive messages from fabric 118 via a Fibre Channel link 380.

Additional PCI bus bridges 322 and 324 provide interfaces for additional PCI buses 326 and 328, from which additional modems or network adapters may be supported. In this manner, data processing system 300 allows connections to multiple network computers.

A memory-mapped graphics adapter 330 and hard disk 332 may also be connected to I/O bus 312 as depicted, either directly or indirectly.

The illustrative embodiment of the present invention may require the generation of a simple table by a SAN administrator in order to define the authorized connections by defining authorized N-port/F-port pairs.

The illustrative embodiment of the present invention may be implemented by a FC switch operating environment, and/or storage subsystem port interface microcode, for example.

The illustrative embodiment of the present invention is dependent on specific hardware, software, or operating system, but can easily be deployed in a SAN consisting of heterogeneous hosts, switches, and storage subsystems using readily available technology which implements IEEE standards.

The illustrative embodiments of the present invention works within the existing IEEE Fibre Channel standards.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for migrating a client between computer electronic complexes (CECs), the method comprising:
   generating a pair of world wide port names (WWPNs) for a virtual fibre channel adapter, the virtual fibre channel adapter being associated with a client, a first one of the pair of WWPNs being an active world wide port name (WWPN), a second one of the pair of WWPNs initially being an inactive WWPN;
   performing an input/output (I/O) operation using the active WWPN of the client; and
   migrating the client from a source computer electronic complex (CEC) to a destination CEC seamlessly using the inactive WWPN.

2. The computer implemented method of claim 1, wherein the migrating comprises:
   determining a small computer system interface (SCSI) target for access by the client through the active WWPN, the SCSI target only being available to selected initiators;
   issuing a command query to a name server through the Virtual I/O Server (VIOS) on a source CEC using the active WWPN of the client and the physical adapter port;
   responsive to the issuing, creating a list of WWPN port names of SCSI targets; and
   sending the created list as an extensible markup language (XML) data stream to an orchestrator from the name server.

3. The computer implemented method of claim 2, wherein the source CEC command query comprises a get adapter command.

4. The computer implemented method of claim 2, wherein the source CEC command query is issued from a source Virtual I/O Server (VIOS) on the source CEC through a virtual fibre channel port.

5. The computer implemented method of claim 3, wherein the get adapter command generates an extensible markup language (XML) data stream, the XML data stream being used to determine client accessibility to the SCSI targets on the destination CEC through a fibre channel port accessible to the VIOS.

6. The computer implemented method of claim 2, wherein the migrating further comprises:
    issuing a destination CEC command query to a name server through the inactive WWPN of the client; and
    responsive to the issuing of a destination CEC command query, determining a list of SCSI targets that are available based on the list of WWPNs.

7. The computer implemented method of claim 6, wherein the destination command query comprises a find devices command.

8. The computer implemented method of claim 6, the migrating further comprising:
    issuing a set adapter command;
    activating the initially inactive WWPN port name as a new active WWPN;
    logging into the fibre channel fabric with the new active WWPN; and
    performing I/O operations with the new active WWPN.

9. The computer implemented method of claim 8, further comprising:
    logging the source CEC off of the fibre channel fabric.

10. The computer implemented method of claim 7, wherein the find devices command comprises an XML data stream.

11. The computer implemented method of claim 1, wherein the virtual fibre channel adapter is associated with a client partition.

12. The computer implemented method of claim 1, wherein migrating the client occurs during the performing of an I/O operation.

13. A system for enabling a partition migration, the system comprising:
    at least two computer electronic complexes (CECs), each CEC comprising at least one Virtual Input/Output Server (VIOS);
    an orchestrator, the orchestrator coordinating the partition migration;
    a storage area network, the storage area network comprising a plurality of SCSI targets, wherein the SCSI targets of the storage area network are only available to selected initiators;
    at least one hypervisor for each CEC, the at least one hypervisor running on each CEC; and
    a fibre channel fabric, the fibre channel fabric comprising a name server, at least one NPort ID Virtualization (NPIV) capable switch and a storage area appliance.

14. The system of claim 13, wherein the hypervisor generates a pair of world wide port names (WWPNs) and enables a communication channel between the client and a port.

15. The system of claim 13, wherein a client of the CEC is migrated during an I/O operation.

16. The system of claim 13, wherein the client accesses appropriate logical units in use for I/O on the destination CEC through the SCSI target ports mapped to the WWPN pair.

17. A computer program product comprising a computer readable storage device, the computer readable storage device comprising instructions stored thereon which when executed by a processor perform actions comprising:
    generating a pair of world wide port names (WWPNs) for a virtual fibre channel adapter, the virtual fibre channel adapter being associated with a client, a first one of the pair of WWPNs being an active world wide port name (WWPN), a second one of the pair of WWPNs being an inactive WWPN;
    performing an I/O operation using the active WWPN; and
    migrating the client from a source computer electronic complex (CEC) to a destination CEC.

18. The computer program product of claim 17, wherein the action of migrating the client comprises:
    determining a small computer system interface (SCSI) target for access by the client through the active WWPN, the SCSI target only being available to selected initiators;
    issuing a source CEC command query to a name server through the active WWPN of the client; and
    responsive to the issuing, receiving a list of WWPN port names of SCSI targets from the name server.

* * * * *